(12) United States Patent
Bortfeld et al.

(10) Patent No.: US 6,567,735 B1
(45) Date of Patent: May 20, 2003

(54) METHOD FOR SHORTENING SHIFTING TIME IN A SEMI-AUTOMATIC TRANSMISSION

(75) Inventors: Harald Bortfeld, Wedemark (DE); Alfred Klatt, Wathlingen (DE); Uwe Winkelholz, Hannover (DE)

(73) Assignee: Wabco GmbH, Hannover (DE)

( * ) Notice: Subject to any disclaimer, the term of this patent is extended or adjusted under 35 U.S.C. 154(b) by 0 days.

(21) Appl. No.: 09/161,146

(22) Filed: Sep. 25, 1998

(30) Foreign Application Priority Data

Sep. 30, 1997 (DE) .......................... 197 43 180

(51) Int. Cl.⁷ .......................... G06F 17/00; G06F 19/00; F16H 47/08
(52) U.S. Cl. .............................. 701/52; 701/64; 701/67; 477/906; 477/907; 477/908; 475/66; 475/67; 475/116; 475/117
(58) Field of Search .............................. 701/62, 63, 64, 701/66, 67, 68, 52; 477/906, 907, 908; 475/116, 117, 66, 67

(56) References Cited

U.S. PATENT DOCUMENTS

| | | | | |
|---|---|---|---|---|
| 4,440,042 A | * | 4/1984 | Holdeman | 74/785 |
| 4,604,700 A | * | 8/1986 | Igarashi et al. | 701/64 |
| 4,676,115 A | * | 6/1987 | Morscheck et al. | 74/339 |
| 4,711,141 A | * | 12/1987 | Speranza | 74/866 |
| 4,989,471 A | * | 2/1991 | Bulgrien | 74/336 R |
| 5,053,961 A | * | 10/1991 | Genise | 701/52 |
| 5,053,962 A | * | 10/1991 | Genise | 701/52 |
| 5,167,311 A | * | 12/1992 | Satoh et al. | 192/73 |
| 5,195,035 A | * | 3/1993 | Asahara et al. | 701/60 |
| 5,612,880 A | * | 3/1997 | Kojima et al. | 701/75 |
| 5,632,706 A | * | 5/1997 | Kremmling et al. | 477/74 |
| 5,771,477 A | * | 6/1998 | Showalter et al. | 701/51 |
| 5,795,265 A | * | 8/1998 | Domian et al. | 477/143 |
| 5,899,829 A | * | 5/1999 | Salecker et al. | 477/78 |
| 5,935,178 A | * | 8/1999 | Streichert | 701/23 |

FOREIGN PATENT DOCUMENTS

| | | |
|---|---|---|
| DE | 3007953 | 9/1981 |
| DE | 3329802 | 2/1985 |
| DE | 3832970 | 4/1990 |
| DE | 19548799 | 6/1996 |
| DE | 19531675 | 3/1997 |
| DE | 19545588 | 6/1997 |
| JP | 5180339 | 7/1993 |
| JP | 7251646 | 10/1995 |

\* cited by examiner

Primary Examiner—Jacques H. Louis-Jacques
Assistant Examiner—Brian J Broadhead
(74) Attorney, Agent, or Firm—Proskauer Rose LLP

(57) ABSTRACT

A method of shortening response time during a gear shifting operation process is applicable to a semi-automatic, electronically controlled transmission of motor vehicles, in particular utility vehicles, takes into account a driver's reaction time to reduce delay in clutch re-engagement. To initiate a gear-shifting operation in such a transmission, the driver actuates a shifting command emitter and at the same time disengages a clutch typically by depressing a clutch pedal. In response thereto, a newly selected gear is engaged in the transmission by an electronic system using outside force assistance, for example compressed fluid. The driver is informed via an acknowledgment device when the clutch can be properly engaged once more. In order to accelerate the entire gear shifting process, and concomitantly shorten the interruption of force flow attendant such shifting process, the acknowledgment device is actuated at a point in time prior to completion of transmission synchronization, when the electronic system has detected the beginning of the synchronization.

16 Claims, 2 Drawing Sheets

METHOD FOR SHORTENING SHIFTING TIME IN A SEMI-AUTOMATIC TRANSMISSION

BACKGROUND OF THE INVENTION

The present invention relates to a process for shortening the time required for shifting gears in a semi-automatic, electronically controlled motor vehicle transmission by reduction of clutch engagement response time.

A semi-automatic transmission refers generally to a transmission in which the selection of a particular gear by a driver electronically actuates a gear shifting operation, and in which a clutch is selectively disengaged during the shifting of gears by a driver-operated clutch pedal. Generally, in such transmissions, the currently selected gear is calculated by an electronic gear-shifting system for readout on a gear display. A gear shift command emitting device, operable by the driver for selection of a desired gear, transmits a gear-shifting command to the electronic system corresponding to the selected gear. The electronic gear-shifting system also computes an advantageous gear, which is displayed by a blinking indicator on the gear display. Concurrent with selection of a particular gear by operation of the gear-shift command emitting device, the driver must simultaneously disengage the clutch by depressing the clutch pedal. The above-mentioned electronic system then generally switches valves connected to a pressure fluid supply, which subsequently shift corresponding gear shift couplings in the transmission via operating cylinders in such manner that the desired upward or downward shift is properly achieved.

When the shifting process to the newly selected gear is completed, an acknowledgment device is actuated by the electronic gear-shifting system, informing the driver that re-engagement of the clutch is properly warranted. The driver then engages the clutch by releasing the clutch pedal. The acknowledgment device may be optical, acoustic or of other sensory format.

A speed shifting system for a transmission actuated by outside force is disclosed in German Patent DE 30 07 953. The system described therein is provided with a gear shift command emitting device whose lever can be pushed initially into a locking position by the driver. This initiates shifting into a different gear. As soon as this is completed, the clutch lever is released from its locked position by means of a locking pin, permitting the lever to then be swiveled further into an end position. By virtue of this "sensory" acknowledgment of the gear shifting action, the driver is informed that he can properly engage the clutch once more, without being distracted by optical or acoustic signals.

A gear shifting apparatus for a synchronized transmission is disclosed in German Patent DE-33 29 802 C2 in which the movement of the sliding bushings of the actuating cylinders or rod systems to which they are connected is detected by means of distance indicators.

A disadvantage of the known arrangements is that the overall time required to shift gears is relatively long, as it includes the reaction time of varying length of the driver of the vehicle for the re-engagement of the clutch.

It is therefore the object of the present invention to propose a process for the shifting of a semi-automatic motor vehicle transmission which shortens the overall shifting time, and thereby also the corresponding duration of force flow interruption occurring during gear shifting.

SUMMARY OF THE INVENTION

In accordance with these and other objects of the invention, there is provided a method for shortening a duration required to shift gears applicable for use in a semi-automatic motor vehicle transmission. Such transmission is controlled by an electronic system with a microprocessor, and includes a shifting command emitter for initiating a gear shifting operation. A clutch, further included in the transmission and which is disengaged by the driver when making a gear selection, can only properly be re-engaged following a completion of gear synchronization. An acknowledgment device for emitting an acknowledgment signal to the driver indicating that re-engagement of the clutch may be properly effected is also provided. In accordance with embodiment of the invention, a determination of the beginning of synchronization is made, and the acknowledgment signal is emitted at such time, in advance of complete synchronization.

The invention makes it possible to considerably shorten the overall time required to switch gears independent of the individual driver's reaction abilities. Contrary to the state of the art, rather than first being emitted upon completed gear shifting action, the acknowledgment signal is sent earlier, when the synchronization begins. The resultant shortening of the period of force flow interruption is especially advantageous when driving up or down an incline, since the speed at which the vehicle travels fluctuates less during the shortened gear-shifting pause.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
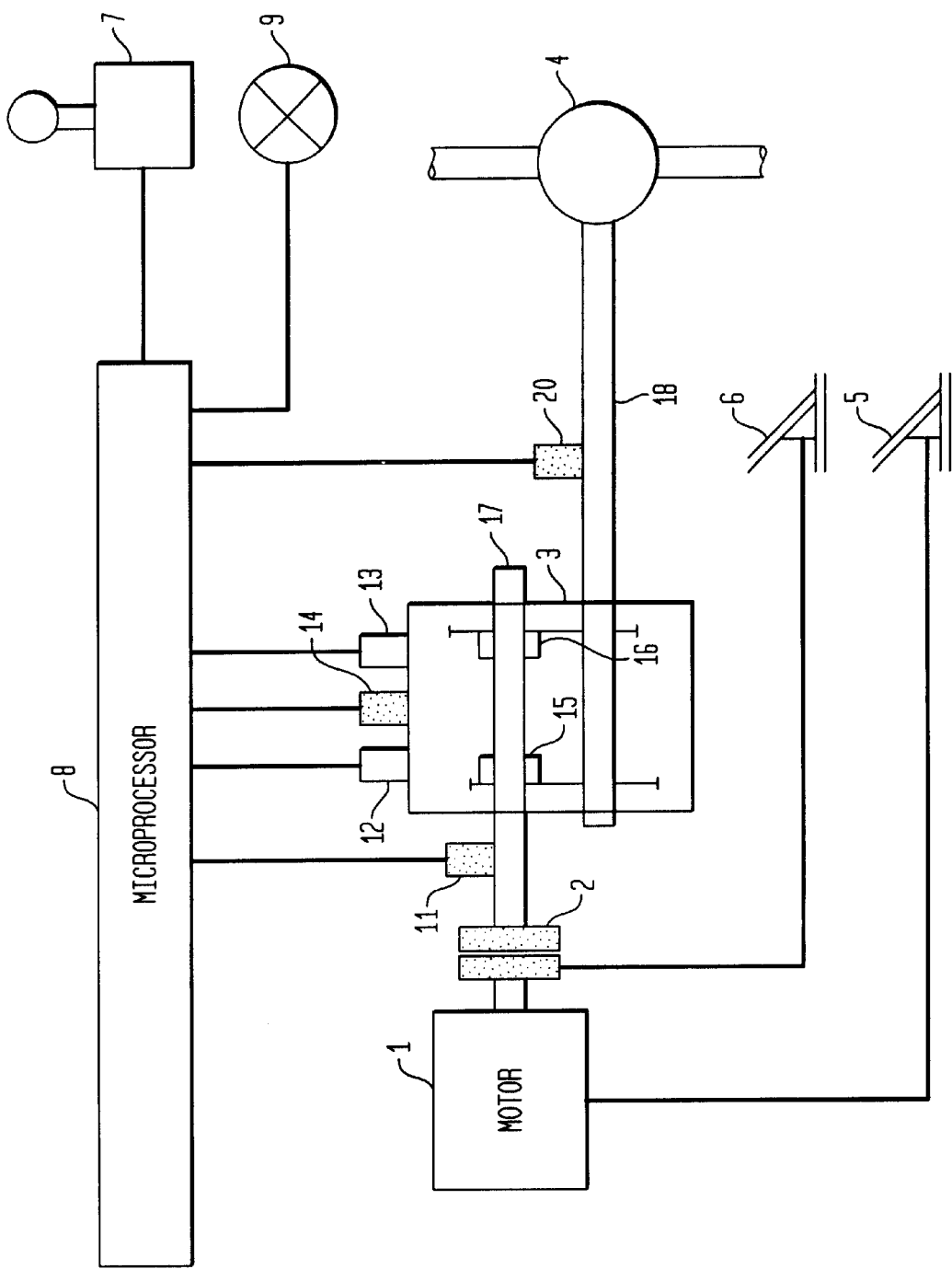
FIG. 1 is a schematic block diagram of the drive train of a motor vehicle, with an electronically controlled transmission actuated by auxiliary force.

Referring now to the figures, and in particular FIG. 1, a schematic block diagram of an entire drive train of a motor vehicle is shown. A motor 1 is drivably connected to an input shaft 17 of a transmission 3 through a disk clutch 2. Input shaft 17 drives a transmission output shaft 18 in a known manner, for example, via several toothed wheels which are constantly engaged. Output shaft 18 is in turn connected to a conventional differential gear 4.

The toothed wheels of input shaft 17 can be coupled to same at will via sliding bushings 15, 16 movably operable by actuating elements 12, 13, each comprising a solenoid valve and an operating cylinder. By means of the solenoid valves of actuating elements 12, 13, a pressurized fluid fed from a supply (not shown) can be utilized to displace sliding bushings 15, 16 along input shaft 17. Compressed air, for example, can be used as a suitable pressure fluid.

A gas pedal 5 and a clutch pedal 6 permit driver-control of motor 1 and disk clutch 2, respectively. A shifting command emitter 7 allows the driver to select a desired gear, and sends a signal representative of the selected gear to an electronic system 8 containing a microprocessor control system. Based upon the received signal, electronic system 8 then activates the appropriate actuating elements 12, 13 to effect a shift in gears corresponding to the driver's selection. Distance sensors 14 are provided for sensing the displacement distances of sliding bushings 15, 16, which transmit the information back to the electronic system 8. In addition, a rotational-speed sensor 11 transmits the rotational speed of transmission input shaft 17 to electronic system 8. Similarly, an additional rotational-speed sensor 20 detects the rotational speed of transmission output shaft 18.

An acknowledgement device 9 is provided for indicating to the driver the point in time when he may properly re-engage disk clutch 2 following selection of a gear. In conventional systems, acknowledgment device 9 is triggered by electronic system 8 upon receipt of displacement information from distance sensors 14 relating to the movement of sliding bushings 15, 16 along input shaft 17 to a location indicative of completion of the intended shifting of gears, and an acknowledgment signal is output therefrom. The signal may be optical, as in the depicted embodiment, or alternatively, acoustical or comprising other sensory stimuli. The acknowledgement signal produced by the triggered acknowledgment device 9 indicates to the driver that the internal gear shifting in transmission 3 has been completed and that engagement of clutch 2 by release of clutch pedal 6 is appropriate.

To ensure that electronic system 8 is universally suitable for use with transmissions of various construction, the position signals of distance sensors 14 are calibrated within electronic system 8 for each program by means of learning processes initiated at first start-up, or alternatively during a course of operation.

Figure 2:
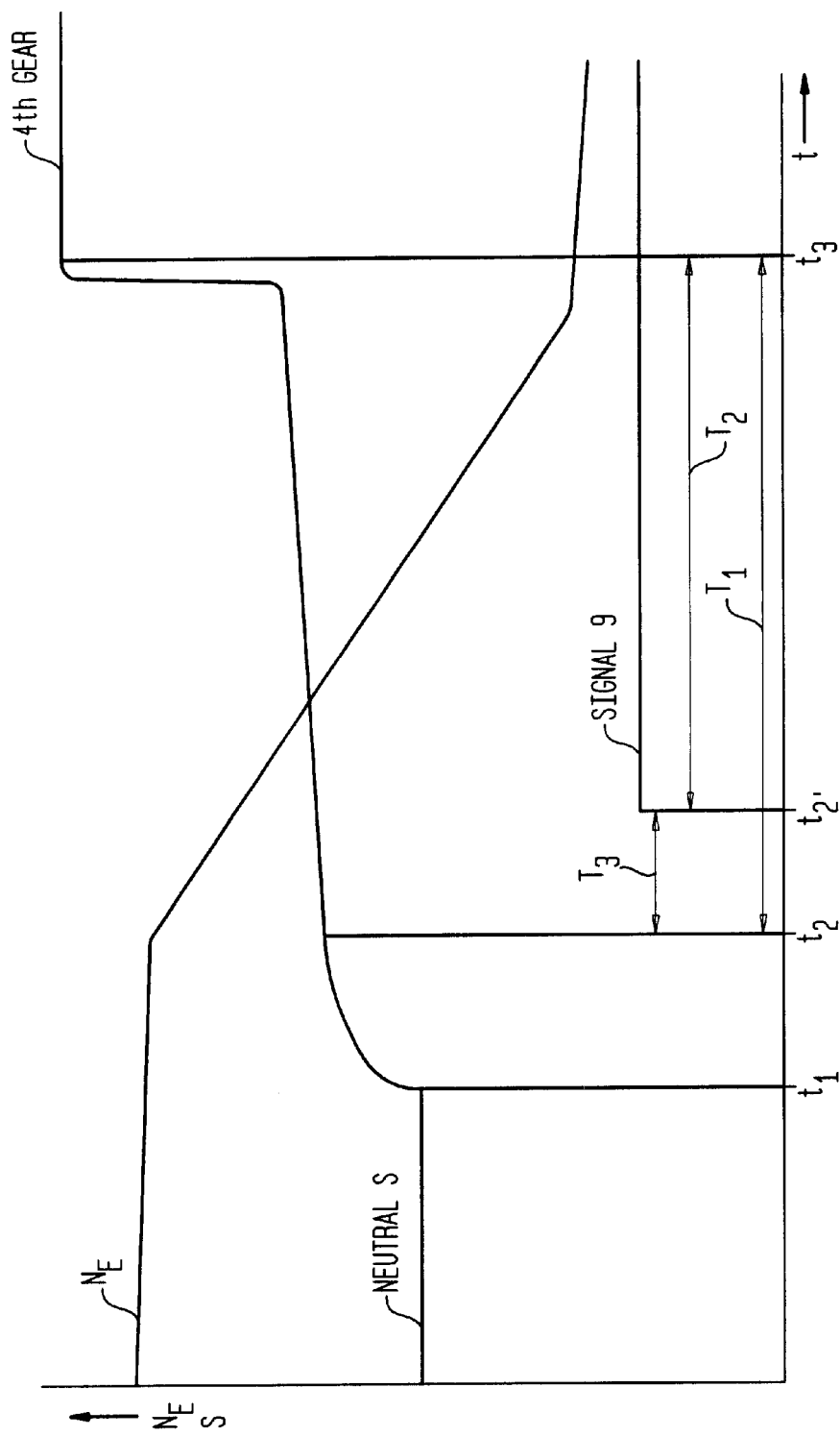
FIG. 2 is a plot diagram of the initial rotational shaft speed ($N_E$) of the transmission as well as of the distance (S) traversed by a sliding bushing of the synchronization apparatus over the time (t) during a gear-shifting process.

Turning now to FIG. 2, the plot shown therein graphically depicts an example of a shifting process from neutral to fourth gear over a period of time. Data representative of rotational speed of transmission input shaft 17 of FIG. 1 is graphically related to elapsed time, plotted as $N_E$ vs. t. The vehicle is first driven in third gear. As is evident from the plot, the rotational speed $N_E$ of transmission input shaft 17 drops to a lower value due to the shifting action. It is noted that the vehicle speed (not shown) remains approximately constant during the shifting action.

The distance S of either of sliding bushing 15, 16 first increases at the beginning of the shifting action $t_1$, until point in time $t_2$, when a grinding position is reached and the actual synchronization process begins. Following this point in time $t_2$, the distance S barely changes. The synchronization is terminated shortly before point in time $t_3$. At such time, the rotational speeds of transmission input shaft 17 and the toothed wheel of the new gear on output shaft 18 match one another. This is indicated graphically by a renewed increase of the distance S of either of sliding bushings 15, 16 shortly before the point in time $t_3$.

In accordance with the invention, evaluation of the signal of distance sensors 14 permits the early determination, at point in time $t_2$, that the synchronization has started, and at this point in time acknowledgment device 9 is actuated. Therefore, the driver can earlier initiate re-engagement of the clutch in anticipation of completion of synchronization, thereby reducing the duration required for the complete shifting process.

Advantageously, electronic system 8 constantly evaluates a number of distance values, for example, approximately ten values of distance sensors 14 of the synchronization apparatus in order to better safeguard against error. In this regard, the oldest value is continually omitted, and the newest value is included. The timely scanning of the position of distance sensors 14 by electronic system 8 takes place advantageously in a 5 ms grid. For security purposes, the evaluated distance values are then formed into a mean value. This mean value is then compared to the next following mean value, and thus a gradient is formed. From the gradient of the averaged distance values, the beginning of the synchronization process occurring at point in time $t_2$ is recognized. Acknowledgment device 9 is actuated by electronic system 8 when the above-mentioned gradient of the averaged distance values falls below a predetermined threshold, i.e. when the distance S increases at only a certain low rate. This is the case shortly following point in time $t_2$.

In order to prevent the driver from engaging the clutch prematurely, a minimum reaction time of the driver which, according to experience, is approximately $T_2=300$ ms, is advantageously taken into account. Acknowledgment device 9 is then advantageously triggered only at a point in time $t_2'$, delayed by a time period $T_3$ after the point in time $t_2$ (see FIG. 2). The delay period $T_3$ is calculated so that the total of time periods $T_2$ and $T_3$ is invariably after the point in time $t_2$. The time period $T_2$ can be calculated from:

$$T_3 = T_1 - T_2$$

where $T_1$ is the overall duration of the synchronization process (see below).

It has furthermore proven to be advantageous that the length of the delay period $T_3$ be rendered dependent on the transmission temperature and/or the manner of the gear change, since these data influence the length of time period $T_1$ of a gear shifting operation.

Distance sensors 14 for recognition of the displacement of sliding bushings 15, 16 may be installed at various suitable locations. Thus, the distances traversed by bushings 15, 16 can be evaluated directly. Alternatively, the distances covered by the actuating devices (i.e. pistons of the operating cylinders) can also be sensed in actuating elements 12, 13. Furthermore, if so desired, the distance sensors can also be installed on the connecting rods.

It is further noted that other approaches may also be employed for determining the beginning of the synchronization process without departure from the invention. For example, the beginning of the synchronization process can be detected from the change in the rotational speed $N_E$ of transmission input shaft 17. As can be seen in FIG. 2, the rotational speed $N_E$ of transmission input shaft 17 has a distinct salient point at the beginning of synchronization, at point in time $t_2$. This can be evaluated in a manner analogous with that described above with regard to analysis of the distance covered by sliding bushings 15, 16.

The two indications of the beginning of synchronization, i.e. the evolution of the distances covered by sliding bushings 15, 16, as well as the salient point of the rotational speed $N_E$ of transmission input shaft 17, can also advantageously be evaluated in combination by electronic system 8.

The anticipated duration $T_1$ of a synchronization process can be calculated in advance from the gradient of the transmission input shaft speed $N_E$ within a range from $t_2$ and $t_3$. This is done according to the formula:

$$T_1 = (N_A - N_E) \bigg/ \frac{\Delta N_E}{\Delta t}$$

where $N_A$=Rotational speed of transmission output shaft 18 relative to the transmission input shaft 17

$N_E$=Rotational speed of transmission input shaft 17

$\frac{\Delta N_E}{\Delta t}$ = Gradient of the rotational speed $N_E$ between $t_2$ and $t_3$ The value of $T_1$ is typically about 500 ms. If one has thus already calculated the anticipated duration of each gear shifting action shortly after the salient point of $N_E$ indicative of the beginning of synchronization (point in time $t_2$), point in time $t_2'$ for the actuation of acknowledgment device 9 can be determined with even greater precision, so that following the completion of the typical shortest reaction time $T_2$ of the driver for re-engagement of the clutch in response thereto (in the order of 300 ms as noted above), the shifting of gears in the transmission is already completed (point in time $t_3$).

Point in time $t_2'$ is then calculated to be $$t_2' = t_2 + (T_1 - T_2)$$

where $t_2$=the point in time of the salient point in $N_E$ or S $T_1$=duration of synchronization $T_2$=minimum driver reaction time.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Method for shortening a duration required for shifting gears in a semi-automatic transmission for motor vehicles controlled by an electronic system with a microprocessor and including a shifting command emitter for initiation of a gear shifting operation carried out by synchronization equipment in the transmission, the transmission further including a clutch, an input shaft, an output shaft, and an acknowledgment device for emitting an acknowledgment signal to a driver that re-engagement of the clutch may be properly effected, the method comprising:

determining a beginning of synchronization of the transmission during a shifting operation; and emitting the acknowledgment signal at said beginning of synchronization.

2. A method according to claim 1, wherein:

the synchronization equipment includes at least one sliding bushing movable along the input shaft; and said beginning of synchronization is recognized by the electronic system from the evolution of a distance covered by said at least one sliding bushing along the input shaft.

3. A method according to claim 1, wherein said step of determining includes evaluating a number of distance values of the synchronization equipment, whereby an oldest one of said number of distance values is continually omitted and a newest one of said number of distance values is included.

4. A method according to claim 3, wherein;

said step of evaluating takes place within about a 5 millisecond grid; and said number of distance values evaluated is approximately 10.

5. A method according to claim 3, wherein an average value is formed from said number of distance values evaluated.

6. A method according to claim 1, wherein:

the synchronization equipment includes at least one sliding bushing movable along the input shaft; and said beginning of synchronization is recognized by the electronic system from a change in a rotational speed of the input shaft.

7. A method according to claim 6, wherein:

a gradient of the rotational speed is formed; and an anticipated duration of a synchronization process is calculated from said gradient.

8. A method according to claim 7, wherein the anticipated duration of the synchronization process is calculated from the formula:

$$T1 = (N_A - N_E) \Big/ \frac{\Delta N_E}{\Delta t}$$

where $N_A$=Rotational speed of the output shaft relative to the input shaft, $N_E$=Rotational speed of the input shaft $\frac{\Delta N_E}{\Delta t}$ = Gradient of the rotational speed $N_E$ between points in time representative of the beginning of synchronization and a completion thereof, respectively.

9. A method according to claim 1, wherein said acknowledgement signal is emitted at a point in time $t_2'$ calculated from the formula:

$$t_2' = t_2 + (T_1 - T_2)$$

where $t_2$=the point in time representative of at least one of a salient point of a rotational speed of the input shaft and when a gradient of a distance covered by said at least one sliding bushing along the input shaft drops below a predetermined threshold, $T_1$=duration of a synchronization process, and $T_2$=minimum driver reaction time.

10. A method for shortening a duration required for shifting gears in a semi-automatic transmission for motor vehicles controlled by an electronic system with a microprocessor and including a shifting command emitter for initiation of a gear shifting operation carried out by synchronization equipment in the transmission, the transmission further including a clutch, an input shaft, an output shaft, and an acknowledgment device for emitting an acknowledgment signal to a driver that re-engagement of the clutch may be properly effected, the method comprising:

determining a beginning of synchronization of the transmission during a shifting operation, said step of determining including evaluating a number of distance values of the synchronization equipment, whereby an oldest one of said number of distance values is continually omitted and a newest one of said number of distance values is included, said step of determining further including forming an average value from said number of distance values evaluated; and emitting the acknowledgment signal at said beginning of synchronization, the electronic system recognizing said beginning of synchronization from a gradient of each said average value over time.

11. A method according to claim 10, wherein the acknowledgment device is actuated by the electronic system when said gradient drops below a predetermined threshold, and when a delay period has ended.

12. A method according to claim 11, wherein said delay period is based at least in part upon a minimum reaction time of the driver.

13. A method according to claim 12, wherein a length of said delay period is based at least in part upon at least one of a transmission temperature and a type of gear change.

14. In a semi-automatic transmission of the type in which operation is controlled by an electronic system with a microprocessor, initiation of a gear shifting operation being carried out by synchronization equipment in the transmission actuated by operation of a shifting command emitter, and in which a clutch is disengaged during the gear switching operation, the transmission including an input shaft, an output shaft, and an acknowledgment device for emitting an acknowledgment signal to a driver that re-engagement of the clutch may be properly effected, the synchronization equipment including at least one sliding bushing movable along the input shaft by operation of actuating elements, the improvement comprising:

distance sensors installed on at least one of said at least one sliding bushing or the actuating elements of said at least one sliding bushing for the recognition of a beginning of a synchronization process by evaluation of a movement covered by said at least one sliding bushing along the input shaft, thereby permitting the acknowledgement signal to be emitted at a point in time in advance of completion of the synchronization process.

15. A semi-automatic transmission according to claim 14, wherein a rotational speed of each of the input shaft and the output shaft is sensed by sensors.

16. A semi-automatic transmission according to claim 14, wherein the acknowledgment device includes means for emitting an acknowledgement signal which is one of optical, acoustical or sensory in nature.

* * * * *